United States Patent
Chan (10) Patent No.: US 6,791,600 B1
(45) Date of Patent: Sep. 14, 2004

(54) VIDEO SYSTEM WITH DUAL MODE IMAGING

(75) Inventor: Michael C. Chan, Los Altos, CA (US)

(73) Assignee: Telesensory Corporation, Sunnyvale, CA (US)

( * ) Notice: Subject to any disclaimer, the term of this patent is extended or adjusted under 35 U.S.C. 154(b) by 0 days.

(21) Appl. No.: 09/372,294

(22) Filed: Aug. 11, 1999

(51) Int. Cl.[7] .............................................. H04N 7/18
(52) U.S. Cl. ............................................. 348/63; 382/114
(58) Field of Search .......................... 348/63, 62, 358, 348/211.9, 240.2, 112, 110, 333.12, 96, 97; 382/114, 182, 274, 299; 283/76, 77; 358/506, 487

(56) References Cited

U.S. PATENT DOCUMENTS

| | | | |
|---|---|---|---|
| 4,803,505 A | * | 2/1989 | Saijo et al. ................... 335/64 |
| 4,990,951 A | * | 2/1991 | Sanbayashi ................... 335/40 |
| 5,125,046 A | | 6/1992 | Siwoff |
| 5,267,331 A | | 11/1993 | Siwoff |
| 5,323,204 A | * | 6/1994 | Wheeler et al. .............. 396/60 |
| 5,793,367 A | * | 8/1998 | Taguchi ....................... 345/756 |
| 5,831,667 A | | 11/1998 | Siminou |
| 5,883,666 A | * | 3/1999 | Kyuma et al. ............... 348/229 |
| 5,959,605 A | * | 9/1999 | Gilblom ...................... 345/671 |
| 6,064,426 A | * | 5/2000 | Waterman .................... 348/63 |
| D430,588 S | * | 9/2000 | Goldberg et al. .......... D16/225 |

\* cited by examiner

*Primary Examiner*—Chris Kelley
*Assistant Examiner*—Behrooz Senfi
(74) *Attorney, Agent, or Firm*—Parsons Hsue & de Runtz LLP (57) ABSTRACT

A video magnifier is provided for capturing images [1] in the fixed shutter mode when the user selects the positive video polarity and [2] in the variable shutter mode when the user selects the negative video polarity. During the fixed shutter mode operation, an image capturing device of the video magnifier has an exposure time that is one half of a period of a cycle of the ac power line.

37 Claims, 9 Drawing Sheets

TV for viewing   Light Weight with a Built in Han
                 Transportable, take it "to go."

stallation, or   Three Easy-to-Use Controls –
                 Image, Magnification and Focus.

20 payments are     Bright Negative Picture Mode –
redit cards,     white letters on a black background
 Companion       for maximum reading comfort con
s.               the brightness of the text on a lo
                 background.

nion is backed
tee and has      Photo Viewing Mode – A medium
 warranty        "Photo Mode" to view photograph
orkmanship.      tions or 3D objects in fine detail

FIG._2B
(PRIOR ART)

Bright Negative P
white letters on a
for maximum reac
the brightness of t
background

FIG._2C
(PRIOR ART)

Bright Negative P
white letters on a
for maximum reac
the brightness of t
background

VIDEO SYSTEM WITH DUAL MODE IMAGING

FIELD OF THE INVENTION

The present invention relates to video systems. More specifically, the present invention relates to low vision video magnifiers that accommodate people with vision impairments.

BACKGROUND OF THE INVENTION

Video magnifiers are often used to assist persons with "low vision" [2] to read printed materials, [2] to view written information while writing, and [3] to look at photographs. Physicians and other health care providers usually use the term "low vision" to describe chronic vision problems that generally cannot be corrected through the use of glasses or other lens devices, medication or surgery. Moreover, symptoms associated with low vision frequently result from a degeneration or deterioration of the retina of a patient's eye, a condition commonly referred to as macular degeneration and associated with older individuals.

Figure 1:
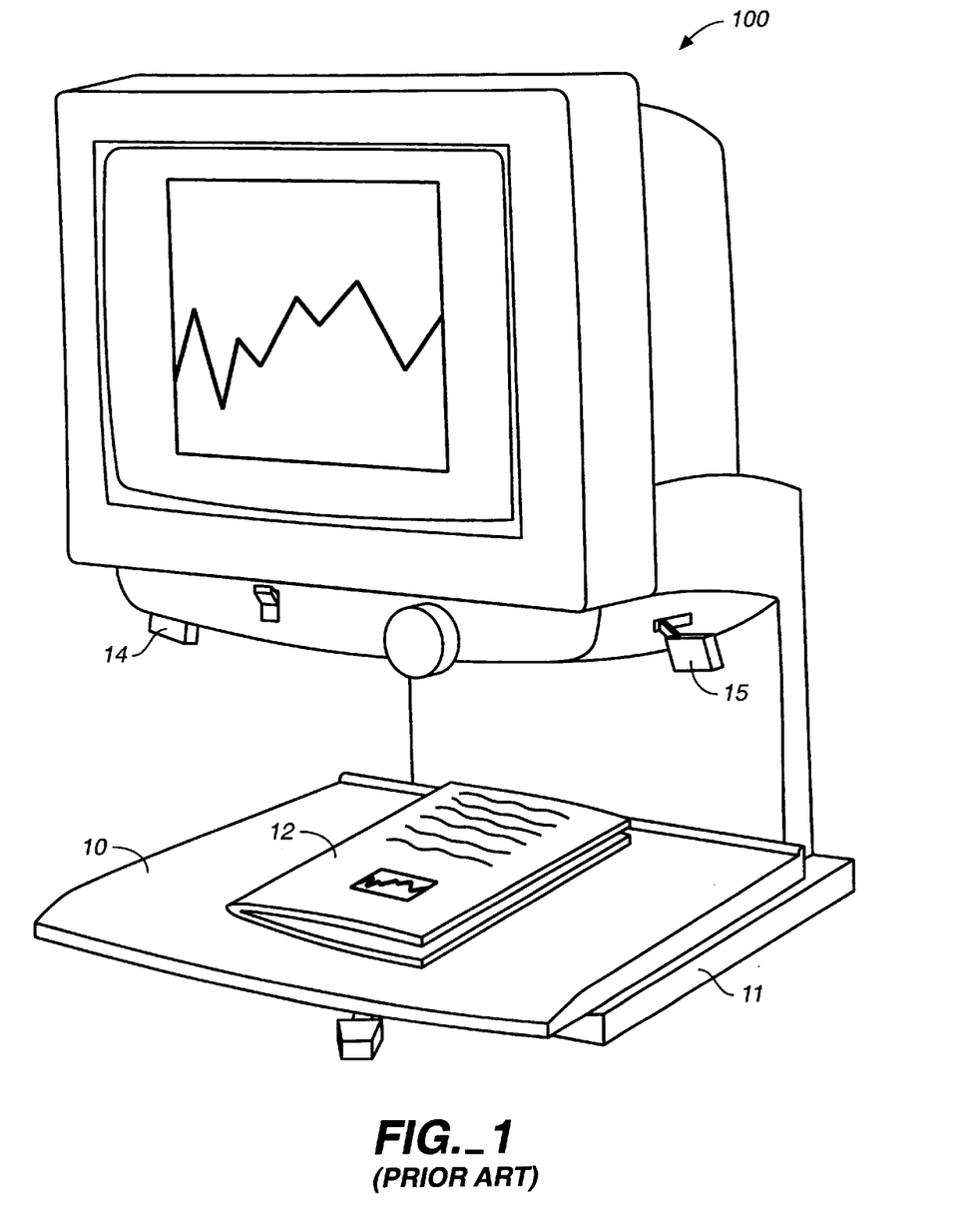
FIG. 1 shows a conventional low vision video magnifier and a magazine placed upon a reading platform of the video magnifier.

FIG. 1 illustrates a video magnifier 100. Such video magnifier 100 is commercially available from Telesensory Corporation located in Sunnyvale, Calif.; Telesensory Corporation is also the assignee of this present application. The video magnifier 100 has a reading platform 10 on top of a base 11 to accommodate a magazine 12, printed materials or photographs. The reading platform 10 may be stationary or slidable along x and y axes. Once a user places the magazine 12 upon the reading platform 10, an image capturing device (not shown) within the video magnifier 100 captures images on a page of the opened magazine. Thereby, the video magnifier 100 displays the captured images to the user at an enlarged view. Additionally, the user may also place a check onto the reading platform 10 and thereby view the enlarged written information while writing.

Figure 2A:
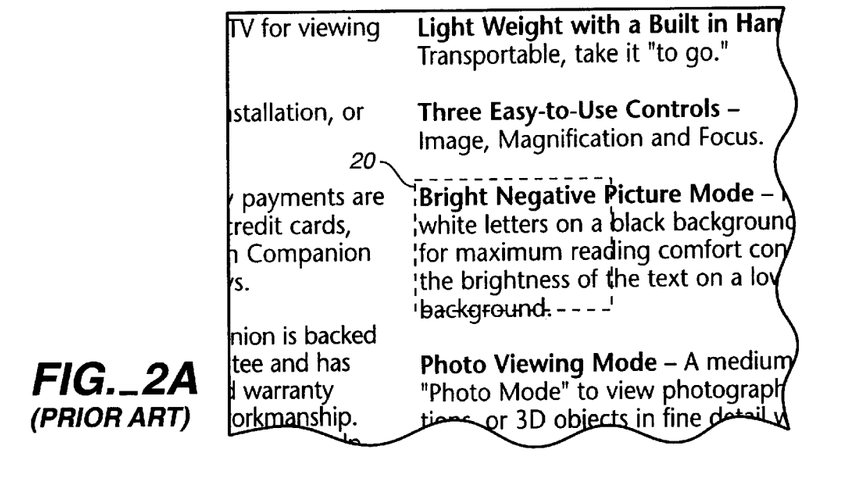
FIG. 2A illustrates a field of view of an image capturing device of the video magnifier of FIG. 1. The field of view is indicated by a dotted box within which printed information from a page of the magazine of FIG. 1 locates.
Figure 2B:
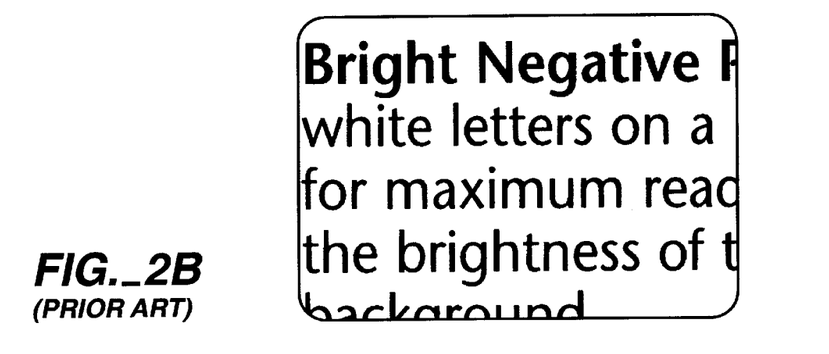
FIGS. 2B and 2C respectively illustrate enlarged positive and negative video images of the printed information captured from the page.
Figure 2C:
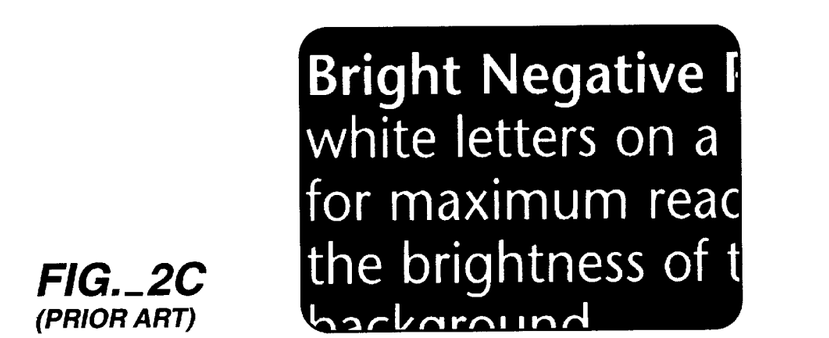

To further accommodate people with vision impairments or low vision, the video magnifier 100 includes a video polarity control lever 14, which is partially shown and is similar to a lever 15, for the user to adjust and thereby see positive and negative video images of the captured images. FIG. 2A illustrates a viewing area of the image capturing device represented by a dotted box 20 within which printed information of, for example, the magazine 12 of FIG. 1 locates. The image capturing device captures such printed information within the dotted box 20. Thereby, depending on the position of the video control lever 14, the video magnifier 100 displays the captured, printed information at an enlarged view having [1] positive video images as shown in FIG. 2B when the user has chosen the positive video polarity or [2] negative video images as shown in FIG. 2C when the user has selected the negative or reverse video polarity. Regarding the selection of the positive and negative video polarities, the positive video polarity is typically selected for viewing photographs, coins, stamps, labels of medicine bottles, and so on. The reason is that there is minimal or no movement of the viewed matters because such movement may yield blurred images especially when the total area of white is more than the total area of black. However, a user with low vision must rely substantially on his or her peripheral vision to see and thus tends to get eye fatigue from viewing the displayed positive video images for a long period of time because the glare produced by the large white area eventually affects the peripheral vision. With respect to the selection of the negative or reverse video polarity, it should be selected when the user wants to read, e.g., a book because the displayed negative video images effectively shows more black than white so as to reduce eye fatigue. However, reading text requires the user to move the book back and forth and, as a result, this movement causes motion blur especially when levels of brightness and contrast of the displayed images are typically set very high to accommodate people with vision impairments.

To capture the printed information, the video magnifier 100 includes a lens and camera assembly (not shown). The video camera of the lens and camera assembly typically contain a charge-coupled device (CCD) and possibly contain a CMOS (complementary metal-oxide semiconductor) image sensor. Although CCD cameras can operate in both fixed and variable shutter modes, the CCD camera of and within the conventional video magnifier 100 captures images in either [1] the fixed shutter mode or [2] the variable or automatic shutter mode, but does not capture images in both modes. In other words, the CCD camera of the conventional video magnifier 100 utilizes only the fixed or variable shutter mode to capture images for both the positive and negative video polarities selections.

The CCD has an exposure time or shutter opening time for each picture frame. This exposure time may be fixed or varied automatically by a circuitry of the camera as a function of the average value of light intensity or brightness falling on the pixel cells of the CCD sensor. During the exposure time, the pixel cells are allowed to accumulate an electronic charge representing a particular picture frame. The value of the electronic charge depends on the light intensity or brightness of the image due to the local illumination and, to some extent, the ambient illumination falling on the reading material.

To ensure that there is sufficient brightness provided upon the magazine 12 for the camera to capture the images, the video magnifier 100 relies primarily on its local illumination and may also rely on the ambient illumination. With respect to the local illumination, the video magnifier 100 typically includes and uses at least one fluorescent lamp or incandescent lamp. Generally, the fluorescent lamps are chosen because they have relatively uniform spectrum and cast a fairly even distribution of light over the reading platform 10 upon which the magazine 12 is placed. With respect to the ambient illumination, fluorescent lamps at the ceiling of a room in which the video magnifier 100 is being operated typically provide such ambient illumination. For both local and ambient illuminations, the fluorescent lamps used may be driven by the ac power line via [1] a magnetic ballast circuit or [2] a high frequency power oscillator (electronic ballast).

Figure 3A:
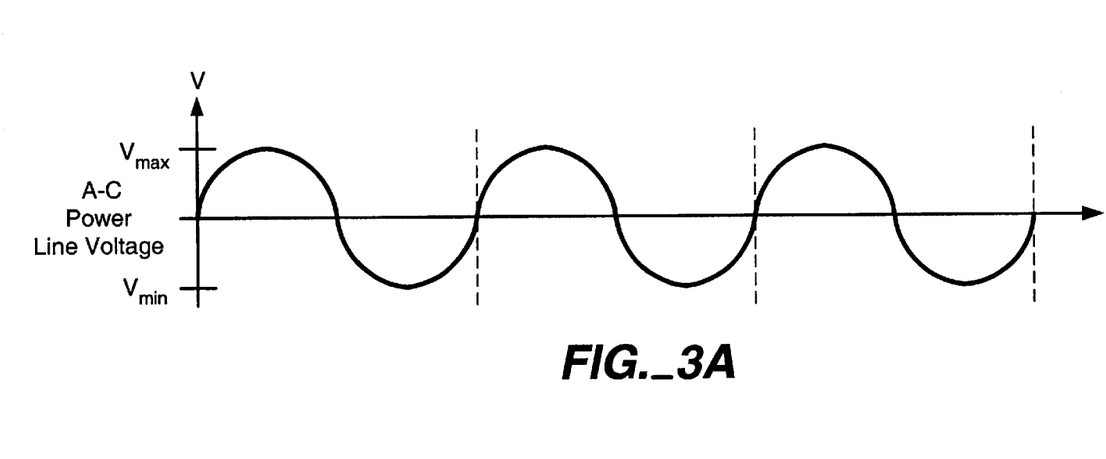
Figure 3B:
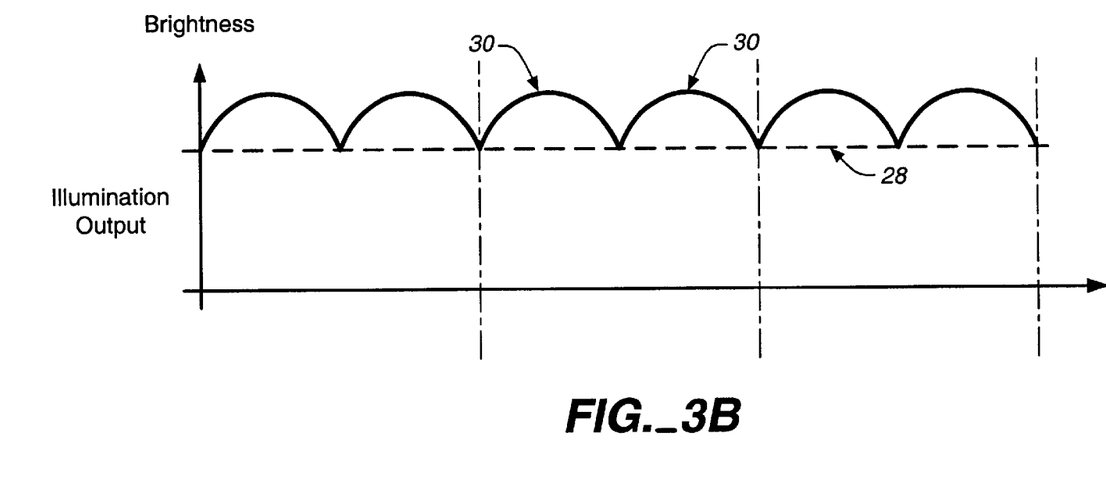
FIG. 3B shows a waveform of an illumination output of fluorescent lamps driven by the ac power line via a magnetic ballast circuit.

When the fluorescent lamps are driven by the a-c power line via the magnetic ballast circuit, their output illumination has a steady state component 28 and a pulsating component 30 as illustrated by FIG. 3B. The pulsating component 30 has a ripple frequency equivalent to twice the ac power line frequency, which may be 50 hertz or 60 hertz, as illustrated by FIG. 3A. This is true for the local fluorescent lamps utilized by the video magnifier 100 as well as for the ambient fluorescent lamps at the ceiling of the room. When the ac power line frequency is different from that of a frequency of 59.94 hertz of a vertical field rate of the camera, an interaction or interference occurs between the frequencies of the output illumination and the vertical field rate and, as a result, a beat frequency is formed. As the difference between the ac power line frequency and the vertical field rate frequency increases, the beat frequency also increases and is more noticeable. With respect to the video magnifier 100, this beat frequency is naturally more noticeable in the displayed video images because the levels of brightness and contrast of the display device of the video magnifier 100 are typically set very high to accommodate users with vision impairments. In particularly, when the positive video polarity is selected and thereby positive video images are displayed, the beat frequency is especially noticeable because the large area of white representing the paper of the magazine 12 is flickering or winking its brightness at the user while the user is viewing such displayed images. In contrast, when the negative video polarity is selected, the beat frequency is less apparent because there is more black area than white area and thus the flickering or winking is less evident.

When the fluorescent lamps are driven by the ac power line via the high frequency power oscillator, their output illumination does not flicker or wink since the drive frequency chosen will be high enough to allow the persistency of their lamp phosphor to filter out the illumination ripple. Although this type of arrangement is most desirable because its steady illumination produces no interaction with the vertical field rate, it is not always utilized because high frequency power oscillators are expensive.

OBJECTS OF THE INVENTION

It is an object of the present invention to provide a video system that captures images and thereby displays the captured images with negligible or without any flickering/winking effect and image motion blur from the perspective of a user who views the captured images.

It is another object of the present invention to provide a video system that allows a user to manually select the operation of an image capturing device of the video magnifier in either a fixed or variable shutter mode.

SUMMARY OF THE INVENTION

According to one embodiment of the present invention, a video system for capturing images via its image capturing device is provided. The video system has a selection device allowing a user to manually select the operation of the image capturing device in either a fixed shutter mode or a variable shutter mode. During the fixed shutter mode operation, the image capturing device of the video system has an exposure time that is one half of a period of a cycle of the ac power line. The video system may also have a second selection device for allowing the user to manually select between positive and negative video polarities so as to view positive and negative video images, respectively.

According to another embodiment of the present invention, a video magnifier is provided for capturing images [1] in the fixed shutter mode when the user selects the positive video polarity and [2] in the variable shutter mode when the user selects the negative video polarity. During the fixed shutter mode operation, an image capturing device of the video magnifier has an exposure time that is one half of a period of a cycle of the ac power line.

According to another embodiment of the present invention, a method of capturing images for display in positive and negative video polarities is provided. First, an image capturing device operable in fixed and variable shutter modes is provided. Second, either the positive or negative video polarity is selected. And finally, the images are captured in the fixed shutter mode when the positive video polarity is selected and in variable shutter mode when the negative video polarity is selected. During its fixed shutter mode operation, the image capturing device has an exposure time that is one half of a period of a cycle of the ac power line.

BRIEF DESCRIPTION OF THE DRAWINGS

Other objects and features of the present invention and many of the attendant advantages of the present invention will be readily appreciated and become better understood by reference to the detailed description when considered in connection with the accompany drawings in which like reference numerals designate like parts throughout the figures thereof and wherein:

FIG. 3A shows a waveform of an ac power line voltage, while

DETAILED DESCRIPTION OF THE PREFERRED EMBODIMENTS

Figure 4A:
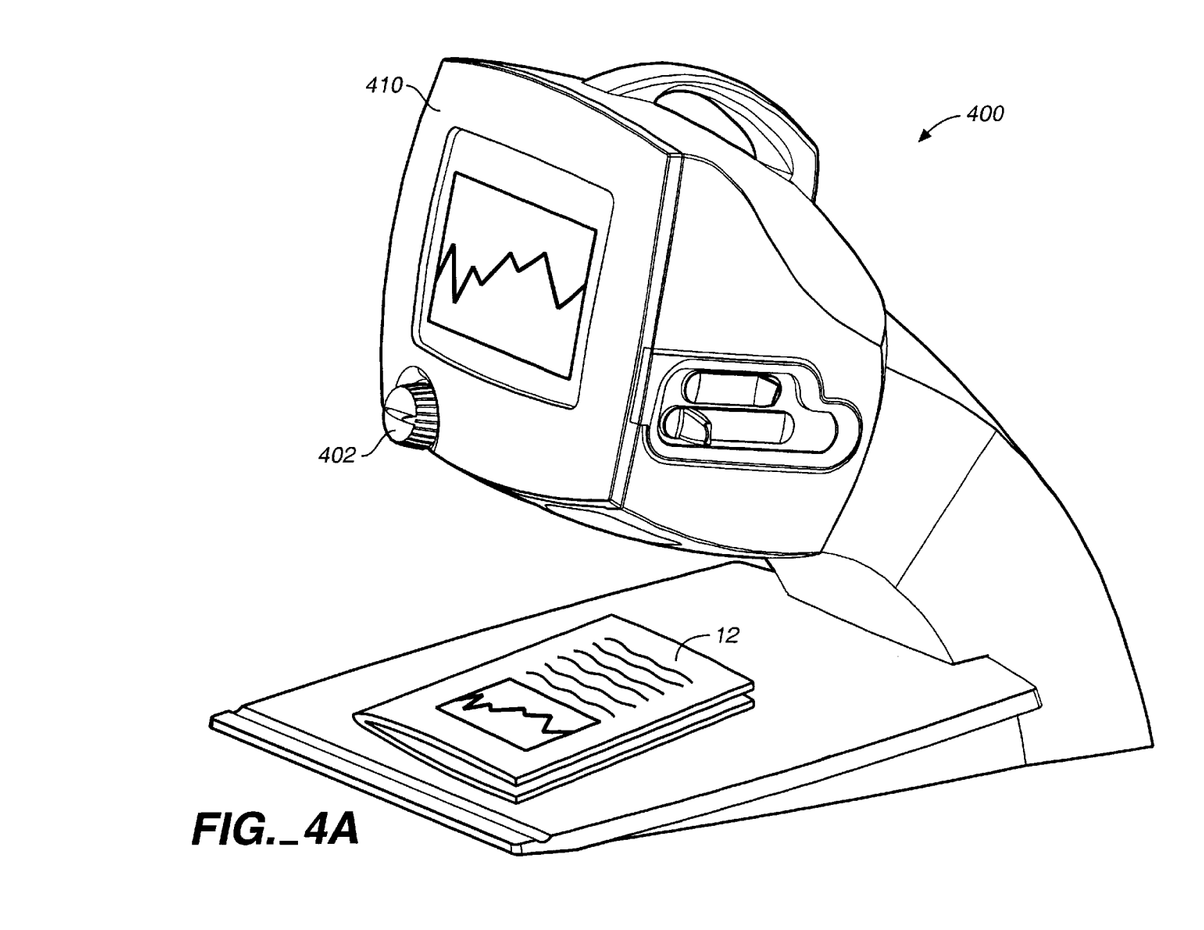
FIG. 4A illustrates external features of a video magnifier of the present by showing an upper right front perspective view of the video magnifier.

FIG. 4A illustrates external features of a video magnifier 400 of the present by showing an upper right front perspective view of the video magnifier 400. The mechanical features of the video magnifier 400 are described in detail by a U.S. Patent Application ("Application") titled "Compact and Portable Video Magnifiers" that was filed on Aug. 4, 1998 by inventors T. Lee Dahlmann, Timothy S. Couture, Michael C. Chan and W. Andrew Morrison. The Application is incorporated by reference herein.

Figure 4B:
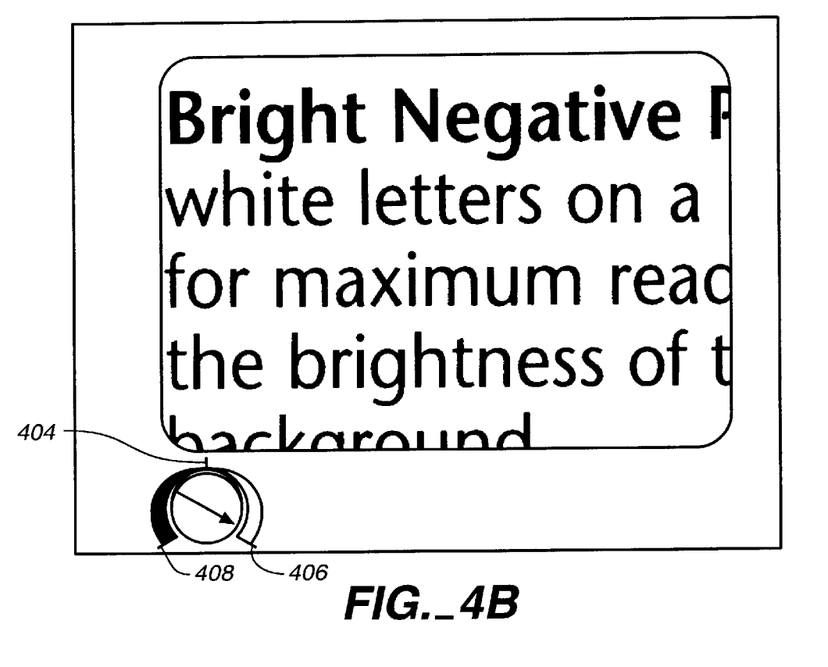
FIGS. 4B and 4C respectively illustrate enlarged positive and negative video images being displayed based on a position that a display selection device of the video magnifier indicates.

The video magnifier 400 has a display device 410. Alternatively, an external display device 410 may be provided by the user and thus the display device 410 may not be a part of the video magnifier 400. The video magnifier 400 does have a video output terminal to which the external display device such as a television may be connected to receive video signals of the captured images. The display device 410 includes a cathode ray tube, a liquid crystal panel or a plasma display panel. In addition, the video magnifier 400 also has a display selection device such as a lever or a variable control knob 402 that is manually selectable between positive and negative video polarities. Referring to FIG. 4B, the variable control knob 402 has a first maximum point 406, a second maximum point 408 and a midpoint 404 therebetween.

FIG. 4B also shows black letters on a white background captured from a page having black letters on a white background when the positive video polarity is selected. As the user turns the variable control knob 402 clockwise from the midpoint 404 towards the first maximum point 406 so as to select the positive video polarity, the display device 410 of the video magnifier 400 shows positive video images of the captured images. That is, the display device.410 shows the positive video images when the variable control knob 402 indicates a first position that [1] locates between the midpoint 404 and the first maximum point 406 and [2] includes the first maximum point 406.

Figure 4C:
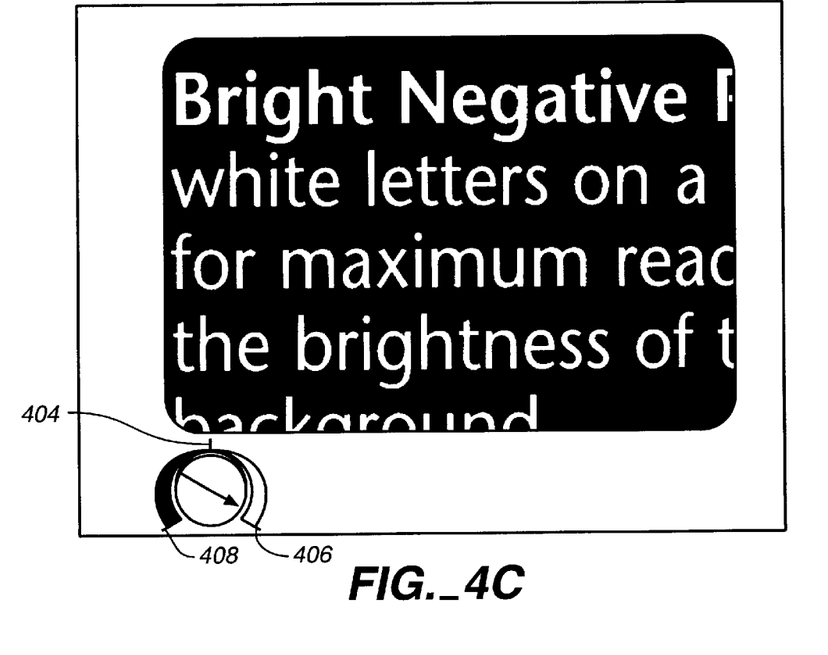

FIG. 4C shows white letters on a black background captured from the page having black letters on the white background when the negative video polarity is selected. As the user turns the variable control knob 402 counterclockwise from the midpoint 404 towards the second maximum point 408 so as to select the negative video polarity, the display device 410 of the video magnifier 400 shows negative video images of the captured images. In other words, the display device 410 shows the negative video images when the variable control knob 402 indicates a second position that [1] locates between the midpoint 404 and the second maximum point 408 and [2] includes the second maximum point 408. In addition, if the variable control knob 402 is turned clockwise from the second position and thereby stopped at the midpoint 404, the display device 410 shows the negative video images. If the variable control knob 402 is turned counterclockwise from the first position and thereby stopped at the midpoint 404, the display device 410 shows the positive video images. Furthermore, as the variable control knob 402 is turned clockwise from the second position and crosses over the midpoint 404, the display device 410 switches from a showing of the negative video images to a showing of the positive video images. Similarly, as the variable control knob 402 is turned counterclockwise from the first position and crosses over the midpoint 404, the display device 410 switches from a showing of the positive video images to a showing of the negative video images. When the display device 410 switches from the showing of the positive video images to the showing of the negative video images and vice versa, the user will not see any image extinction at the point of switching. In effect, the display device 410 continuously shows either the positive or negative video images when the video magnifier 400 is operating.

It should be noted that the video magnifier 400 may be modified so that its display device 410 shows [1] the positive video images when the variable control knob 402 indicates the second position and [2] the negative video images when the variable control knob 402 indicates the first position. If so, the descriptions of the variable control knob 402 above and below respectively apply to this alternative embodiment.

Moreover, the user also may adjust levels of brightness and contrast of the positive and negative video images being displayed via the variable control knob 402. With respect to FIGS. 4B and 4C, the user may adjust the levels of brightness and contrast of [1] the displayed positive video images when the variable knob 402 is turned clockwise from the midpoint 404 towards the first maximum point 406 and [2] the displayed negative video images when the variable control knob 402 is turned counterclockwise from the midpoint 404 towards to the second maximum point 408. More specifically, the levels of brightness and contrast of the displayed positive video images monotonically increase as the variable control knob 402 is turned clockwise from the midpoint 404 towards the first maximum point 406. That is, the lowest levels of brightness and contrast are at the midpoint 404 while the highest levels are at the first maximum point 406. Likewise, the levels of brightness and contrast of the displayed negative video images monotonically increase as the variable control knob 402 is turned counterclockwise from the midpoint 404 towards the second maximum point 408. In other words, the lowest levels of brightness and contrast are at the midpoint 404 while the highest levels are at the second maximum point 408. As a result, as the variable control knob 402 is turned counterclockwise from the first position and crosses over the midpoint 404, the display device 410 switches from the showing of the positive video images at the lowest levels of brightness and contrast to the showing of the negative video images at the lowest levels of brightness and contrast, and vice versa.

To capture images of a reading matter 402 placed upon a reading platform 412 of FIG. 4A, the video magnifier 400 contains an image capturing device (not shown). The image capturing device includes a video camera that preferably contain a CCD. The CCD camera is operable in fixed and variable shutter modes by the circuitry of the camera.

When the user manually selects the positive video polarity by adjusting the variable control knob 402 so that it indicates the first position, the image capturing device captures images of the reading matter 402 in the fixed shutter mode while the display device 410 shows the positive video images. As mentioned previously, the positive video polarity is typically selected when the user wants to read or view matters that require little movement by the user. When the positive video polarity is selected and thus positive video images are shown, the flickering effect is more noticeable because of the large white area. This flickering effect is substantially eliminated or suppressed by capturing images in the fixed shutter mode with the exposure time of the CCD set to a time value preferably equivalent to one half of a period of a cycle of the ac power line supplying voltages to ambient lamps, which may include fluorescent lamps. By setting the exposure time to this value, each electronic charge of each picture frame captured during the fixed shutter mode has the same voltage value because the same amount of time integral of light intensity has fallen on the pixel cells during the charge accumulation process. This is further explained with respect to FIGS. 5A through 5D.

Figure 5A:
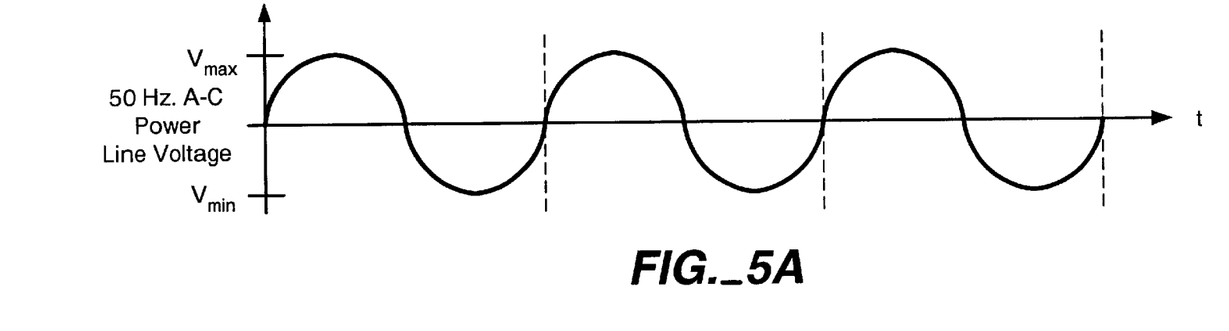
FIG. 5A shows a waveform of an ac power line voltage having a frequency of 50 Hz.
Figure 5B:
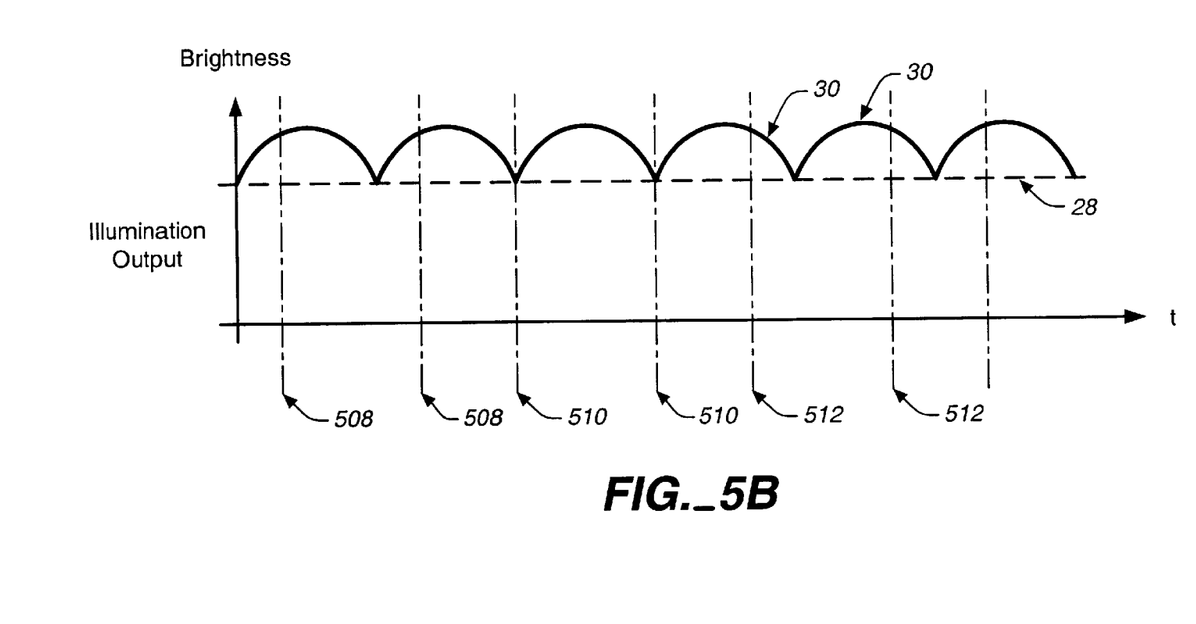
FIG. 5B shows a waveform of an illumination output of a fluorescent lamp driven by this 50 Hz. ac power line via a magnetic ballast circuit.
Figure 5C:
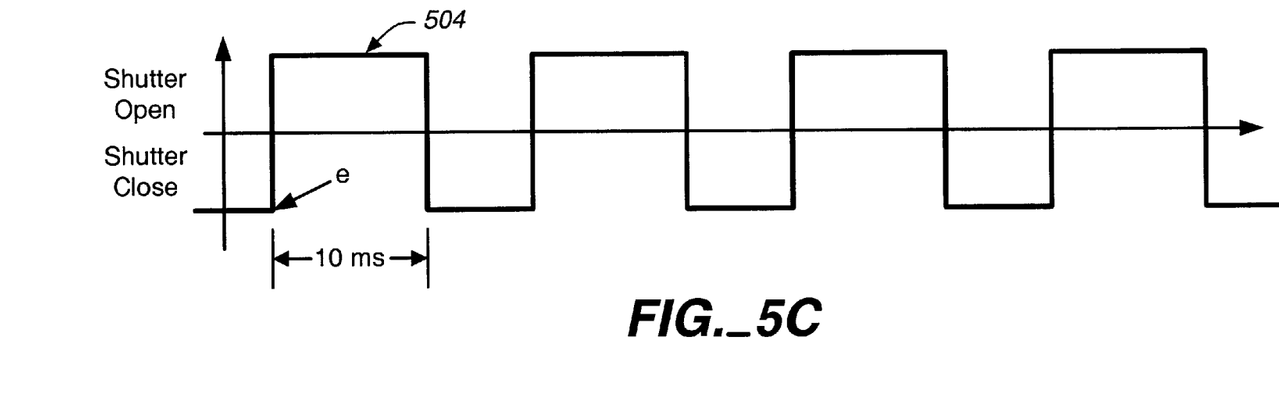
FIG. 5C shows a waveform of shutter opening and closing times of an image capturing device of the video magnifier of FIG. 4A.
Figure 5D:
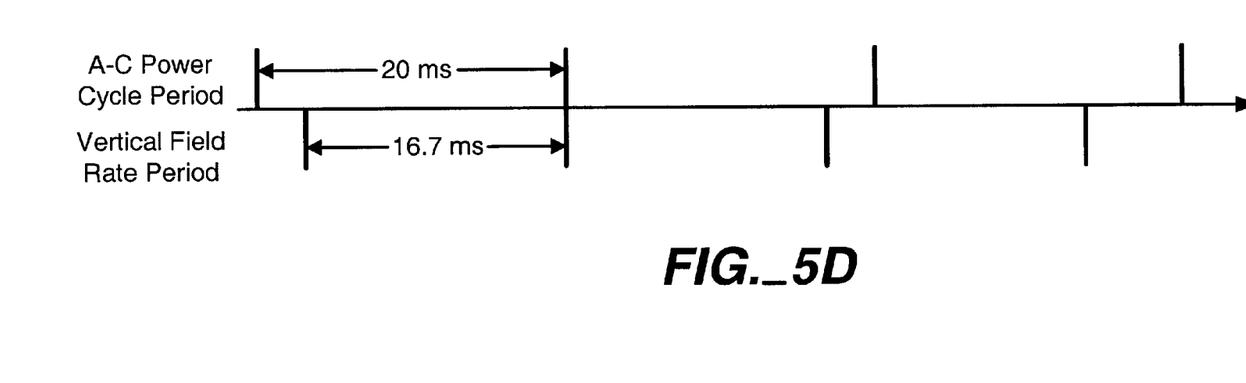
FIG. 5D illustrate the 50 HZ. ac power line cycle period and the vertical field rate period of the image capturing device.

FIG. 5A shows a waveform of an ac power line voltage having a frequency of 50 Hz. FIG. 5B shows a waveform of an illumination output of ambient and local fluorescent lamps driven by this 50 Hz. ac power line via a magnetic ballast circuit. Note that a ripple frequency of a pulsating component 30 of the illumination output is twice the ac power line frequency. FIG. 5C shows a waveform of shutter opening and closing times 504 and 506, respectively, of the image capturing device. FIG. 5D illustrate [1] the 50 Hz. ac power line cycle periods that are located above a time axis and [2] the vertical field rate periods of the image capturing device that are located below the time axis. Point "e" represents a time at which the image capturing device begins to capture images. Note that [1] each shutter opening time 504 or exposure time is a fraction of the vertical field rate period and [2] the exposure time of 10.0 milliseconds is one half of the 50 Hz. ac power line cycle period, which is 20.0 milliseconds. During each exposure time period, the same amount of illumination output or light intensity falls on the CCD pixel cells as indicated by three pairs of dotted lines 508, 510 and 512. That is, the pixel cells receive the same amount of illumination energy from the fluorescent lamps for each picture frame regardless of when the image capturing device begins to capture images. Therefore, when the positive video images are displayed, there is no winking or flickering effect because the electronic charge generated for each picture frame captured during the fixed shutter mode has the same value.

As indicated above, the time value of the exposure time during the fixed shutter mode operation depends on the frequency of the ac power line, which may be 50 Hz. or 60 Hz. When the frequency of the ac power line is 50 Hz., the exposure time is preferably 10.0 milliseconds. When the frequency of the ac power line is 60 Hz., the exposure time is preferably 8⅓ milliseconds. Although the exposure time is preferably set to a time value equivalent to one half of the ac power line period to suppress the flickering or winking effect, the video magnifier 400 is still functional even when the exposure time is [ 1 ] between 8.0 milliseconds and 12.0 milliseconds or between 9.5 milliseconds and 10.5 milliseconds with respect to the 50 Hz. ac power line and [2] between 6.0 milliseconds and 10.0 milliseconds or between 8.0 milliseconds and 8⅔ milliseconds with respect to the 60 Hz. ac power line.

When the user manually selects the negative video polarity by adjusting the variable control knob 402 so that it indicates the second position, the image capturing device captures images of the magazine 12 in the variable or automatic shutter mode while the display device 410 shows the negative video images. As previously mentioned, the negative video polarity is typically selected when the user wants to read, e.g., the magazine 12. As the user moves the magazine 12 being read rapidly across the field of view or viewing area of the image capturing device, the angular velocity of the magazine can be quite high especially when the magnification of the captured images is set high to accommodate people with vision impairments. Thus, this movement causes image motion blur. Since the exposure time of the CCD during the variable shutter mode is typically 5 milliseconds or less, it is desirable to capture images in the variable shutter mode when the user selects the negative video polarity because this short exposure time substantially reduces or eliminate the noticeable motion blur. Furthermore, the negative video signal of the captured images is given higher amplification and is then subjected to black and white clippings to further remove image fading and any residual brightness flickering or winking.

In addition to allowing the user to manually select between the positive and negative video polarities via the variable control knob 402, the video magnifier 400 may also include an optional shutter mode selection device so that the user can manually select between the fixed and variable shutter modes. This embodiment effectively would provide the user with four operational choices with respect to capturing and displaying images. The user may select either [1] the positive video polarity and the fixed shutter mode, [2] the positive video polarity and the variable shutter mode, [3] the negative video polarity and the fixed shutter mode or [4] the negative video polarity and the variable shutter mode.

Figure 6:
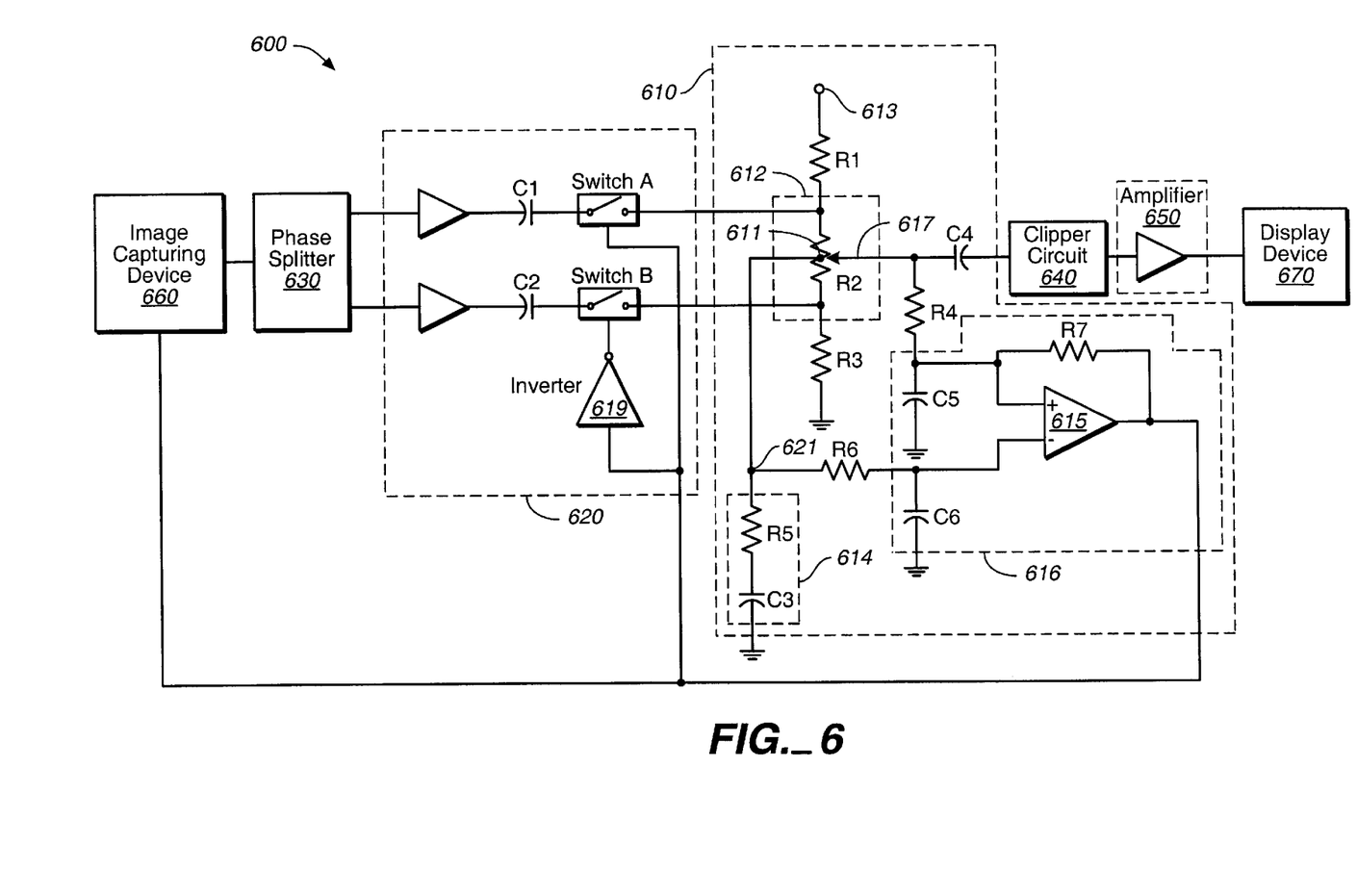
FIG. 6 shows a circuitry within video magnifier of FIG. 4A. This circuitry is directed to the operational features of capturing and displaying images by the video magnifier.

The above features and operations of the video magnifier 400 of the present invention are further explained with respect to a circuitry 600 shown by FIG. 6. It should be noted that the circuitry 600 is a preferred embodiment and is directed to the operational features of capturing and displaying images by the video magnifier 400 as explained above.

Referring to FIG. 6, the circuitry 600 includes a video control circuit 610, a switching circuit 620, a phase splitter 630, a clipper circuit 640, and a video output amplifier 650. FIG. 6 also shows an image capturing device 660 and a display device 410, both of which are connected to the circuitry 600. When the user selects the positive video polarity via the variable control knob 402, the video control circuit 610 generates a first signal. This first signal is provided to both the image capturing device 660 and the switching circuit 620. In response, the image capturing device 660 captures images in the fixed shutter mode and thereby generates a video signal of the captured images. Then, this video signal is provided to the phase splitter 630. In response, the phase splitter 630 generates positive and negative video signals of the video signal and thereby amplified both the positive and negative signals. More specifically, the negative video signal receives higher amplification than the positive video signal. Thereby, both the positive and negative video signals are provided to the switching circuit 620. The switching circuit 620 responds to the first signal received from the video control circuit 610 by providing the positive video signal to the video control circuit 610 that thereby provides the positive video signal to the clipper circuit 640. Because the positive video signal receives lower ampliation than the negative video signal, the high and low peaks of the positive video signal are not clipped. Before the positive video signal is received by the display device 410, the video output amplifier 650 further amplifies the positive video signal so as to accommodate people with low visions. Once the display device 410 receives the positive video signal from the video output amplifier 650, the positive video images are displayed to the user. In addition, an auxiliary output (not shown) of the video output amplifier 650 also provides the positive video signal to an output terminal (not shown) to which an external display device provided by the user may be connected. Thus, the video magnifier 400 may be modified so that it does not include the display device 410.

When the user selects the negative video polarity via the display device, the video control circuit 610 generates a second signal. This second signal is provided to both the image capturing device 660 and the switching circuit 620. In response, the image capturing device 660 captures images in the variable shutter mode and thereby generates a video signal of the captured images. Then, this video signal is provided to the phase splitter 630. In response, the phase splitter 630 generates positive and negative video signals of the video signal and thereby amplified both the positive and negative signals. Again, the negative video signal receives higher amplification than the positive video signal. Thereby, both the positive and negative video signals are provided to the switching circuit 620. The switching circuit 620 responds to the second signal received from the video control circuit 610 by providing the negative video signal to the video control circuit 610 that thereby provides the negative video signal to the clipper circuit 640. Because the negative video signal receives higher amplification than the positive video signal, the high and low peaks of the negative video signal are clipped. In other words, the negative video signal is subjected to black and white clippings. Before the negative video signal is received by the display device 410, the video output amplifier 650 further amplifies the negative video signal so as to accommodate people with low visions. Once the display device 410 receives the negative video signal from the video output amplifier 650, the negative video images are displayed to the user. In addition, the auxiliary output of the video output amplifier 650 also provides the negative video signal to the output terminal to which the external display device provided by the user may be connected. Again, the video magnifier 400 may be modified so that it does not include the display device 410.

The operations of the video control circuit 610 and the switching circuit 620 are further explained in detail with respect to their primary internal components. When the user adjusts the variable control knob 402, the user effectively adjusts a wiper 617 of a variable resistor R2 of a voltage generator 612. Variable resistor R2 has a center tap 611 that [1] couples to the negative input terminal of a dc comparator 615 of a comparator circuit 616 and [2] locates at a position at which one half of the resistance value of the variable resistor R2 is above and below. At a node 613, the voltage is a constant dc voltage supplied by an internal dc source (not shown). Thus, the voltage at the center tap 611 is or approximately is equivalent to one half of the voltage at the node 613 because resistance values of resistors R1 and R3 are equivalent. Functionally, the resistor R1 isolates the positive video signal, received from the switching circuit 620, from the dc source so that the ac component of such positive video signal is not shorted to the ac ground of the dc source. Similarly, the resistor R3 isolates the negative video signal, received from the switching circuit 620, from the ground so that the ac component of such negative video signal is not shorted to the ground.

When the user adjusts the variable control knob 402 so that the wiper 617 is above the center tap 611 and towards the resistor R1 (or indicates a first position), the dc voltage at the non-inverting terminal of the dc comparator 615 is greater than the dc voltage at the negative input terminal of the dc comparator 615. Note that capacitors C5 and C6 ensure that the non-inverting and inverting terminals of the dc comparator 615 only receive the dc component of their respective input signals by shorting the ac component of such input signals to the ground. When the non-inverting terminal receives a higher dc voltage than the inverting terminal receives, the output of the dc comparator 615 is a "1" or high signal. This high signal is provided to both the image capturing device 660 and the switching circuit 620. In response, the image capturing device 660 captures images in the fixed shutter mode and thereby generates a video signal of the captured images. Then, this video signal is provided to the phase splitter 630. In response, the phase splitter 630 generates positive and negative video signals of the video signal and thereby amplified both the positive and negative signals. More specifically, the negative video signal receives higher amplification than the positive video signal. Thereby, both the positive and negative video signals are provided to the switching circuit 620. Switch A of the switching circuit 620 responds to the high signal received from the video control circuit 610 by closing and conducting so as to provide the positive video signal to the video control circuit 610. In contrast, switch B of the switching circuit 620 is open because it effectively receives a "0" or low signal due to an inverter 619 of the switching circuit. Via the switch A, the switching circuit 620 provides the positive video signal to the video control circuit 610 that thereby provides the positive video signal to the clipper circuit 640. Because the positive video signal receives lower amplification than the negative video signal, the high and low peaks of the positive video signal are not clipped. Before the positive video signal is received by the display device 410, the video output amplifier 650 further amplifies the positive video signal so as to accommodate people with low visions. Once the display device 410 receives the positive video signal from the video output amplifier 650, the positive video images are displayed to the user. Moreover, the auxiliary output of the video output amplifier 650 also provides the positive video signal to the output terminal to which the external display device provided by the user may be connected. Thus, the video magnifier 400 may be modified so that it does not include the display device 410.

When the wiper 617, indicating the first position which is above the center tap 611, is turned and stopped such that the wiper 617 thereby indicates the center tap position, the output signal of the dc comparator 615 still remains high so that switch A stays closed while switch B remains open. Thus, the positive video signal is still provided to the video control circuit 610. In this instance, a resistor R5 of a crossover circuit 614 of the video control circuit 610 ensures that a low level positive video signal is retained by the video control circuit 610 with respect to node 621 and is not shorted to the ground by a capacitor C3. Additionally, predetermined levels of brightness and contrast of the displayed positive and negative video images depend on the resistance value of the resistor R5. Thus, the resistor R5 is preferably a variable resistor whose value may be determined by a video magnifier manufacturer.

When the user adjusts the variable control knob 402 so that the wiper 617 is below the center tap 611 and towards the resistor R3 (or indicates a second position), the dc voltage at the positive input terminal of the dc comparator 615 is lesser than the dc voltage at the negative input terminal of the dc comparator 615. As a result, the output of the dc comparator 615 is a "0" or low signal. This low signal is provided to both the image capturing device 660 and the switching circuit 620. In response, the image capturing device 660 captures images in the variable shutter mode and thereby generates a video signal of the captured images. Then, this video signal is provided to the phase splitter 630. In response, the phase splitter 630 generates positive and negative video signals of the video signal and thereby amplified both the positive and negative signals. Again, the negative video signal receives higher amplification than the positive video signal. Thereby, both the positive and negative video signals are provided to the switching circuit 620. The switch B of the switching circuit 620 effectively receives the high signal from the video control circuit 610 due to the inverter 619 and responds by closing and conducting so as to provide the negative video signal to the video control circuit 610. In contrast, the switch A of the switching circuit 620 is open because it receives the low signal. Via the switch B, the switching circuit 620 provides the negative video signal to the clipper circuit 640. Via the switch B, the switching circuit 620 provides the negative video signal to the video control circuit 610 that thereby provides the negative video signal to the clipper circuit 640. Because the negative video signal receives higher amplification than the positive video signal, the high and low peaks of the negative video signal are clipped. That is, the negative video signal is subjected to black and white clippings. Before the negative video signal is received by the display device 410, the video output amplifier 650 further amplifies the negative video signal so as to accommodate people with low visions. Once the display device 410 receives the negative video signal from the video output amplifier 650, the negative video images are displayed to the user. In addition, the auxiliary output of the video output amplifier 650 also provides the positive video signal to the output terminal to which the external display device provided by the user may be connected. Thus, the video magnifier 400 may be modified so that it does not include the display device 410.

When the wiper 617, indicating the second position which is below the center tap 611, is turned and stopped such that the wiper 617 thereby indicates the center tap position, the output signal of the dc comparator 615 still remains low so that switch B stays closed while switch A remains open. Thus, the negative video signal is still provided to the video control circuit 610. In this instance, the resistor R5 of the crossover circuit 614 of the video control circuit 610 ensures that a low level negative video signal is retained by the video control circuit 610 with respect to node 621 and is not shorted to the ground by the capacitor C3.

Furthermore, when the wiper 617, indicating the first position which is above the center tap 611, is turned towards the second position, which is below the center tap 611, the display device 410 switches from a showing of the positive video images at predetermined low levels of brightness and contrast to a showing of the negative video images at predetermined low levels of brightness and contrast as the wiper crosses over and is below the center tap 611. Similarly, when the wiper 617 is turned from second position towards the first position, the display device 410 switches from a showing of the negative video images at predetermined low-levels of brightness and contrast to a showing of the positive video images at predetermined low levels of brightness and contrast as the wiper 617 crosses over and is above the center tap 611. To prevent any potential unstable or indeterminable condition in which the display device 410 would randomly switches back and forth between showings of the positive and negative video images when the wiper 617 is at or near the center tap 611, a resistor R7 provides a small amount of hysteresis due to the positive feedback so that such teasing or hunting effect is eliminated.

Figure 7:
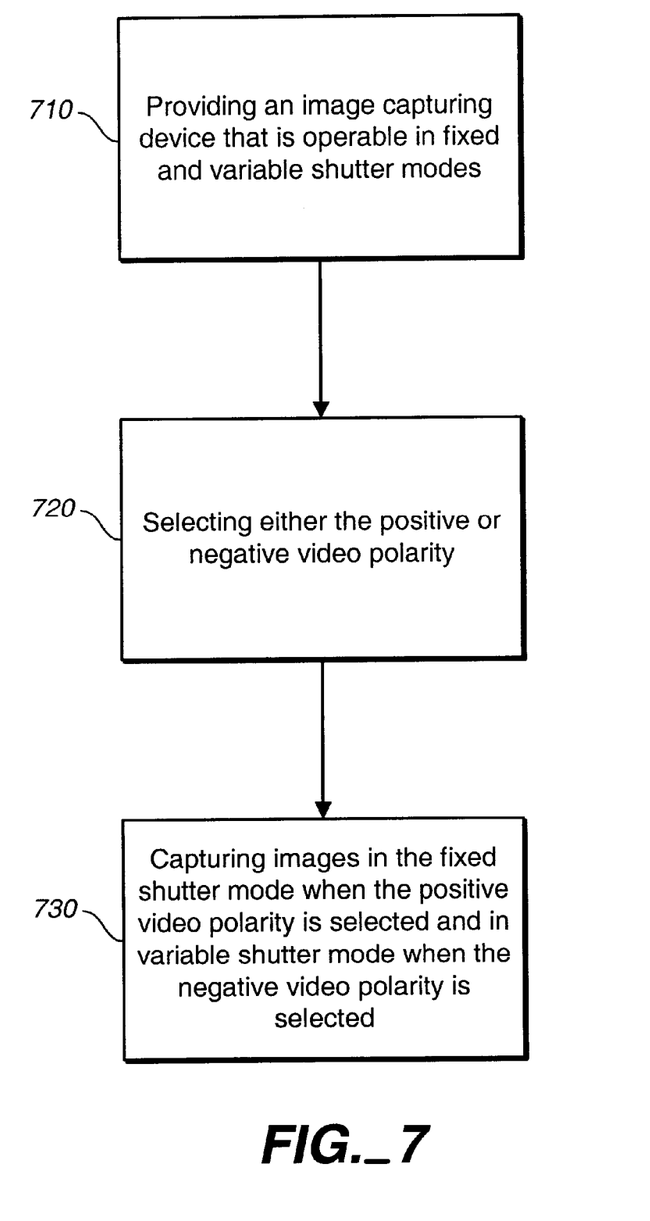
FIG. 7 illustrates a flow chart of a method of capturing images for display in positive and negative video polarities according to the present invention.

FIG. 7 illustrates a flow chart of a method of capturing images for display in positive and negative video polarities according to the present invention. In step 710, an image capturing device that is operable in fixed and variable shutter modes is provided. In step 720, either the positive or negative video polarity is selected. An finally, in step 730, images are automatically captured in the fixed shutter mode when the positive video polarity is selected and in variable shutter mode when the negative video polarity is selected. Preferably, the exposure time of the image capturing device during its operation in the fixed shutter mode is set to one half of a period of a cycle of an ac power line supplying voltages to ambient lamps.

With the present invention has been described in conjunction with several alternative embodiments, these embodiments are offered by way of illustration rather than by way of limitation. Those skilled in the art will be enabled by this disclosure to make various modifications and alterations to the embodiments described without departing from the spirit and scope of the present invention. Accordingly, these modifications and alterations are deemed to lie within the spirit and scope of the present invention as specified by the appended claims.

I claim:

1. A video magnifier for capturing images of a reading matter placed upon a surface above which an image capturing device of the video magnifier is positioned to capture the images, said video magnifier comprising:

a display selection device for a user to manually select between positive and negative video polarities;

a video control circuit generating a first signal when the positive video polarity is selected and a second signal when the negative video polarity is selected, wherein the image capturing device responds to the first and second signals to capture images in a fixed shutter mode when the first signal is received and in a variable shutter mode when the second signal is received, and further wherein the image capturing device generates a video signal of the captured images;

a phase splitter generating positive and negative video signals of the video signal received from the image capturing device; and a switching circuit responsive to the first and second signals to provide the positive video signal received from the phase splitter to the video control circuit when the first signal is received and the negative video signal received from the phase splitter to the video control circuit when the second signal is received.

2. The video magnifier of claim 1, wherein an exposure time of the image capturing device during its operation in the fixed shutter mode is one half of a period of a cycle of an ac power line, said ac power line supplying voltages to ambient lamps.

3. The video magnifier of claim 1, wherein an exposure time of the image capturing device during its operation in the fixed shutter mode is between 6.0 milliseconds and 10.0 milliseconds when an ac power line that supplies voltages to ambient lamps has a frequency of 60 hertz.

4. The video magnifier of claim 3, wherein the exposure time is between 8.0 milliseconds and 8⅔ milliseconds.

5. The video magnifier of claim 1, wherein an exposure time of the image capturing device during its operation in the fixed shutter mode is between 8.0 milliseconds and 12.0 milliseconds when an ac power line that supplies voltages to ambient lamps has a frequency of 50 hertz.

6. The video magnifier of claim 5, wherein the exposure time is between 9.5 milliseconds and 10.5 milliseconds.

7. The video magnifier of claim 1 further comprises a display device that shows black letters on a white background captured from a page having black letters on a white background when the positive video polarity is selected, and shows white letters on a black background captured from said page when the negative video polarity is selected.

8. The video magnifier of claim 7, wherein:

the display selection device movable between first maximum and second maximum points that have a midpoint therebetween;

positive video images are displayed when the display selection device is moved from the midpoint towards the first maximum point;

negative video images are displayed when the display selection device is moved from the midpoint towards the second maximum point;

the display selection device adjusts levels of brightness and contrast of the displayed positive video images when the display selection device is moved from the midpoint towards the first maximum point; and the display selection device adjusts levels of brightness and contrast of the displayed negative video images when the display selection device is moved from the midpoint towards the second maximum point.

9. The video magnifier of claim 8, wherein the display device continuously shows either the positive or negative video images when the video magnifier is operating.

10. The video magnifier of claim 9, wherein the display device switches from a showing of the negative video images at predetermined levels of brightness and contrast to, a showing of the positive video images at predetermined levels of brightness and contrast as the display selection device is moving towards the first maximum point and crosses over the midpoint, and vice versa.

11. The video magnifier of claim 8, wherein the levels of brightness and contrast of the displayed positive video images monotonically increase as the display selection device is moved from the midpoint towards the first maximum point, and further wherein the levels of brightness and contrast of the displayed negative video images monotonically increase as the display selection device is moved from the midpoint towards the second maximum point.

12. The video magnifier of claim 7, wherein:
the display selection device movable between first maximum and second maximum points that have a midpoint therebetween;
the positive video images are displayed when the display selection device is moved from the midpoint towards the second maximum point;
the negative video images are displayed when the display selection device is moved from the midpoint towards the first maximum point;
the display selection device adjusts levels of brightness and contrast of the displayed positive video images when the display selection device is moved from the midpoint towards the second maximum point; and
the display selection device adjusts levels of brightness and contrast of the displayed negative video images when the display selection device is moved from the midpoint towards the first maximum point.

13. The video magnifier of claim 12, wherein the display device continuously shows either the positive or negative video images when the video magnifier is operating.

14. The video magnifier of claim 13, wherein the display device switches from a showing of the positive video images at predetermined levels of brightness and contrast to a showing of the negative video images at predetermined levels of brightness and contrast as the display selection device is moving towards the first maximum point and crosses over the midpoint, and vice versa.

15. The video magnifier of claim 12, wherein the levels of brightness and contrast of the displayed positive video images monotonically increase as the display selection device is moved from the midpoint towards the second maximum point, and further wherein the levels of brightness and contrast of the displayed negative video images monotonically increase as the display selection device is moved from the midpoint towards the first maximum point.

16. The video magnifier of claim 1, wherein the video control circuit comprises:
a voltage generator producing a first voltage having a constant value and a second voltage having a value that depends on a position at which the display selection device is selected; and
a comparator circuit comparing the first and second voltages received from the voltage generator and thereby generating the first signal when second voltage is higher than the first voltage and the second signal when the second voltage is lower than the first voltage, said comparator circuit coupling to the voltage generator.

17. The video magnifier of claim 16 further comprises:
a clipper circuit coupling to the video control circuit; and
an amplifier coupling to the clipper circuit, wherein:
the clipper circuit clips both high and low peaks of the negative video signal received from the video control circuit and thereby provides the clipped negative video signal to the amplifier;
the amplifier amplifies the clipped negative video signal and thereby provides the amplified, clipped negative video signal to an output terminal; and the amplifier amplifies the positive video signal and thereby provides the amplified positive video signal to the output terminal.

18. The video magnifier of claim 17, wherein the amplifier provides the amplified, clipped negative video signal and the amplified positive video signal to a display device.

19. The video magnifier of claim 17, wherein:
the video control circuit further comprises a crossover circuit coupling to the voltage generator and the comparator circuit, said crossover circuit retaining one of the positive and negative video signals when the first and second voltages are equal; and
the video control circuit provides said one of the positive and negative video signals to the clipper circuit.

20. The video magnifier of claim 16, wherein the voltage generator includes a variable resistor having a value that depends on a position at which the display selection device is selected, and further wherein levels of brightness and contrast of the positive and negative video signals depend on the value of the variable resistor.

21. A video magnifier for capturing images of a reading matter placed upon a surface above which an image capturing device of the video magnifier is positioned to capture the images in response to a display selection device of the video magnifier manually selectable between positive and negative video polarities, said video magnifier comprising:
a switching circuit; and
a video control circuit comprising:
a voltage generator producing a first voltage having a constant value and a second voltage having a value that depends on a position at which the display selection device is selected; and
a comparator circuit comparing the first and second voltages received from the voltage generator and thereby generating a first signal when second voltage is higher than the first voltage and the second signal when a second voltage is lower than the first voltage;
wherein the first signal is provided to the image capturing device and the switching circuit when the positive video polarity is selected, and in response, the image capturing device captures images in a fixed shutter mode and provides positive and negative video signals of the captured images to the switching circuit that thereby only provides the positive video signal to the video control circuit; and
wherein the second signal is provided to the image capturing device and the switching circuit when the negative video polarity is selected and in response, the image capturing device captures images in a variable shutter mode and provides positive and negative video signals of the captured images to the switching circuit that thereby only provides the negative video signal to the video control circuit.

22. The video magnifier of claim 21 further comprises:
a clipper circuit coupling to the video control circuit; and
an amplifier coupling to the clipper circuit, wherein:
the clipper circuit clips both high and low peaks of the negative video signal received from the video control circuit and thereby provides the clipped negative video signal to the amplifier;
the amplifier amplifies the clipped negative video signal and thereby provides the amplified, clipped negative video signal to an output terminal; and
the amplifier amplifies the positive video signal and thereby provides the amplified positive video signal to the output terminal.

23. The video magnifier of claim 22, wherein the amplifier provides the amplified, clipped negative video signal and the amplified positive video signal to a display device.

24. The video magnifier of claim 23, wherein the display device shows black letters on a white background captured from a page having black letters on a white background when the positive video polarity is selected, and shows white letters on a black background captured from said page when the negative video polarity is selected.

25. The video magnifier of claim 24, wherein:
the display selection device movable between first maximum and second maximum points that have a midpoint therebetween;
positive video images are displayed when the display selection device is moved from the midpoint towards the first maximum point;
negative video images are displayed when the display selection device is moved from the midpoint towards the second maximum point;
the display selection device adjusts levels of brightness and contrast of the displayed positive video images when the display selection device is moved from the midpoint towards the first maximum point; and
the display selection device adjusts levels of brightness and contrast of the displayed negative video images when the display selection device is moved from the midpoint towards the second maximum point.

26. The video magnifier of claim 25, wherein the display device continuously shows either the positive or negative video images when the video magnifier is operating.

27. The video magnifier of claim 26, wherein the display device switches from a showing of the negative video images at predetermined levels of brightness and contrast to a showing of the positive video images at predetermined levels of brightness and contrast as the display selection device is moving towards the first maximum point and crosses over the midpoint, and vice versa.

28. The video magnifier of claim 25, wherein the levels of brightness and contrast of the displayed positive video images monotonically increase as the display selection device is moved from the midpoint towards the first maximum point, and further wherein the levels of brightness and contrast of the displayed negative video images monotonically increase as the display selection device is moved from the midpoint towards the second maximum point.

29. The video magnifier of claim 24, wherein:
the display selection device movable between first maximum and second maximum points that have a midpoint therebetween;
positive video images are displayed when the display selection device is moved from the midpoint towards the second maximum point;
negative video images are displayed when the display selection device is moved from the midpoint towards the first maximum point;
the display selection device adjusts levels of brightness and contrast of the displayed positive video images when the display selection device is moved from the midpoint towards the second maximum point; and
the display selection device adjusts levels of brightness and contrast of the displayed negative video images when the display selection device is moved from the midpoint towards the first maximum point.

30. The video magnifier of claim 29, wherein the display device continuously shows either the positive or negative video images when the video magnifier is operating.

31. The video magnifier of claim 29, wherein the display device switches from a showing of the positive video images at predetermined levels of brightness and contrast to a showing of the negative video images at predetermined levels of brightness and contrast as the display selection device is moving towards the first maximum point and crosses over the midpoint, and vice versa.

32. The video magnifier of claim 29, wherein the levels of brightness and contrast of the displayed positive video images monotonically increase as the display selection device is moved from the midpoint towards the second maximum point, and further wherein the levels of brightness and contrast of the displayed negative video images monotonically increase as the display selection device is moved from the midpoint towards the first maximum point.

33. The video magnifier of claim 22, wherein the video control circuit further comprises a crossover circuit coupling to the voltage generator and the comparator circuit, said crossover circuit retaining one of the positive and negative video signals when the first and second voltages are equal, and further wherein the video control circuit provides said one of the positive and negative video signals to the clipper circuit.

34. The video magnifier of claim 21, wherein the voltage generator includes a variable resistor having a value that depends on a position at which the display selection device is selected, and further wherein levels of brightness and contrast of the positive and negative video signals depend on the value of the variable resistor.

35. The video magnifier of claim 21, wherein an exposure time of the image capturing device during its operation in the fixed shutter mode is one half of a period of a cycle of an ac power line, said ac power line supplying voltages to ambient lamps.

36. The video magnifier of claim 21, wherein an exposure time of the image capturing device during its operation in the fixed shutter mode is between 6.0 milliseconds and 10.0 milliseconds when an ac power line that supplies voltages to ambient lamps has a frequency of 60 hertz.

37. The video magnifier of claim 21, wherein an exposure time of the image capturing device during its operation in the fixed shutter mode is between 8.0 milliseconds and 12.0 milliseconds when an ac power line that supplies voltages to ambient lamps has a frequency of 50 hertz.

* * * * *